(12) United States Patent
Narumanchi et al.

(10) Patent No.: US 8,522,259 B2
(45) Date of Patent: Aug. 27, 2013

(54) EVENT BASED ROUTING BETWEEN PRESENTATION AND BUSINESS LOGIC COMPONENTS

(75) Inventors: Ravikanth Narumanchi, Hyderabad (IN); Shashank Pawaskar, Hyderabad (IN)

(73) Assignee: Accenture Global Services Limited, Dublin (IE)

( * ) Notice: Subject to any disclaimer, the term of this patent is extended or adjusted under 35 U.S.C. 154(b) by 432 days.

(21) Appl. No.: 12/613,243

(22) Filed: Nov. 5, 2009

(65) Prior Publication Data

US 2010/0125854 A1    May 20, 2010

(30) Foreign Application Priority Data

Nov. 18, 2008 (IN) .................. 2437/MUM/2008

(51) Int. Cl.
*G06F 3/00* (2006.01)
(52) U.S. Cl.
USPC ........................................ 719/318
(58) Field of Classification Search
None
See application file for complete search history.

(56) References Cited

U.S. PATENT DOCUMENTS

| | | | |
|---|---|---|---|
| 7,610,575 B2 * | 10/2009 | Sproule | 717/103 |
| 7,904,909 B1 * | 3/2011 | Reiner et al. | 718/104 |
| 2001/0051906 A1 * | 12/2001 | Esposito | 705/35 |
| 2003/0018555 A1 * | 1/2003 | Callan et al. | 705/35 |
| 2005/0022211 A1 * | 1/2005 | Veselov et al. | 719/318 |
| 2005/0091575 A1 * | 4/2005 | Relyea et al. | 715/502 |
| 2008/0104025 A1 * | 5/2008 | Dharamshi et al. | 707/3 |

* cited by examiner

*Primary Examiner* — Emerson Puente
*Assistant Examiner* — Dong Kim
(74) *Attorney, Agent, or Firm* — Harrity & Harrity, LLP

(57) ABSTRACT

A business application framework comprising a variety of components that operate on an event-driven basis is described. In an embodiment, a delegate component is provided that receives requests from one or more presentation layer components to process various event. For any given request, the delegate component instantiates a controller component to process the event. In turn, the controller instantiates a routing logic component in order to determine a specific handler component for processing of the event by the underlying business layer. The handler component acts as a parent to one or more business layer components necessary to process the event. The handler component creates a response that is subsequently returned to the presentation layer component. During the design phase, only a plurality of events relevant to the presentation layer need to be defined to allow completion of the presentation layer, thereby allowing for the rapid development business applications.

7 Claims, 5 Drawing Sheets

- PRIOR ART -

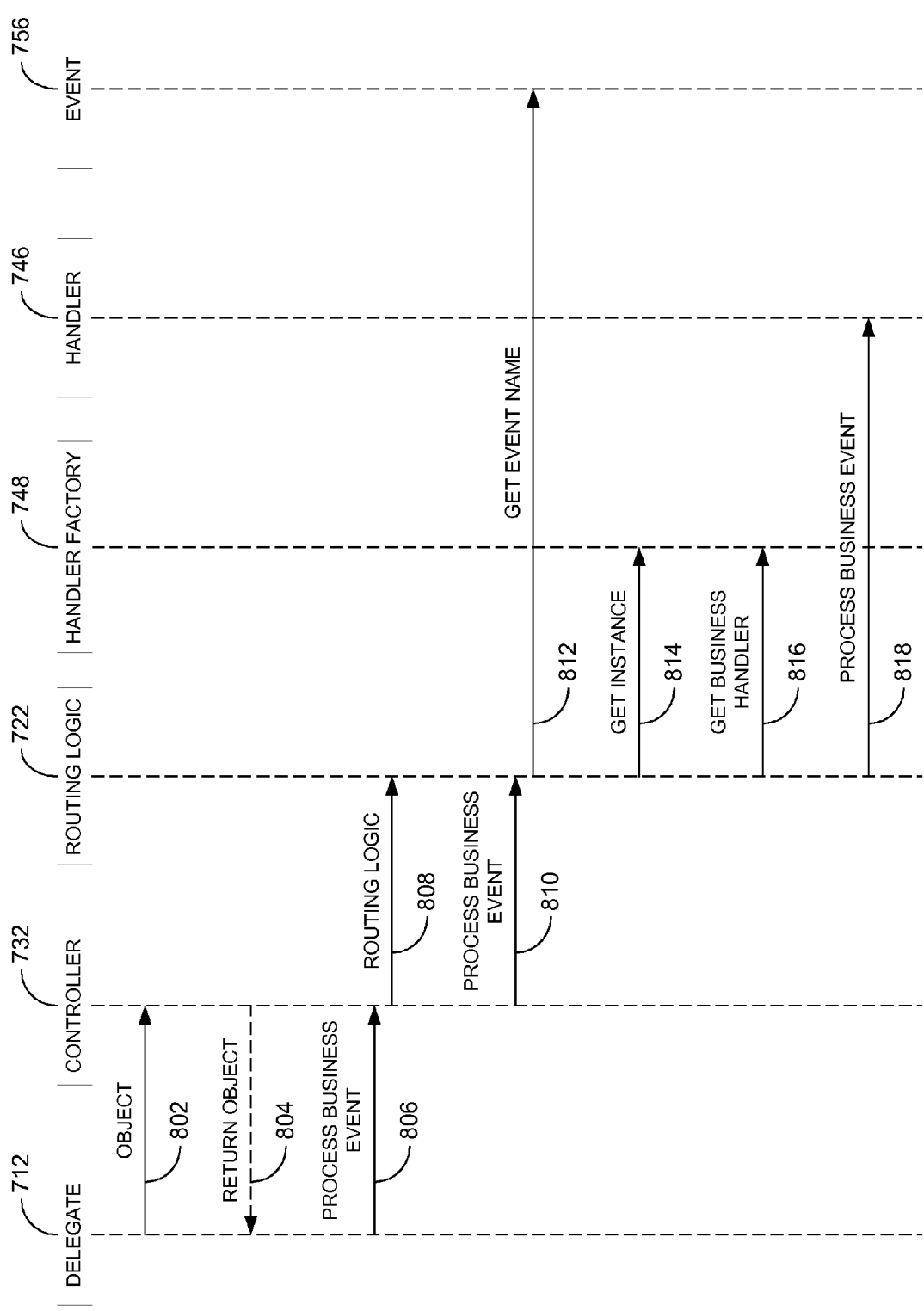

EVENT BASED ROUTING BETWEEN PRESENTATION AND BUSINESS LOGIC COMPONENTS

FIELD OF THE INVENTION

The present invention relates to development and operation of applications comprising a presentation layer and a business layer and, in particular, to the provision of an event-driven framework that reduces the interdependencies of presentation layer components and business layer components.

BACKGROUND OF THE INVENTION

Business applications, such as Web-based electronic commerce applications, are well known in the art. A typical high-level abstraction for such applications is illustrated in FIG. 1, in which an application 100 comprises a presentation layer 102 that communicates with a business layer 104 that, in turn, communicates with a data layer 106. Typically, the presentation layer 102 implements those functions used in presenting information to, and receiving inputs from, a user of the application, e.g., a person attempting to purchase goods or services via the business application. When certain tasks need to be performed to complete the interactions with the user, the presentation layer 102 interacts with the business layer 104 that typically encompasses the functions necessary to achieve the purpose of the application, e.g., verify a user's credit, verify availability of the requested product, complete the purchase, etc. To complete these functions, the business layer 104 communicates with the data layer 106, typically implementing suitable database and database management system functionality, to process the requisite data.

In developing such applications, it is often the case that the various layers 102-106 are developed in such a way that they are very co-dependent upon the implementation of each other. For example, web applications developed on JavaServer Pages are known to sometimes commingle database code, page design code, and control flow code. As a result, it becomes difficult to complete development of any one layer without the simultaneous development of other layers, thereby often unnecessarily delaying development of a given layer.

Given this, so-called application frameworks are known to provide means for independently developing various layers in business applications. For example, the well-known "STRUTS" framework provided by the Apache Software Foundation uses a Model-View-Controller (MVC) architecture, wherein the "model" represents the business or database code, the "view" represents the page design code, and the "controller" represents the navigational code. This framework also provides three key components: (a) a "request" handler provided by the application developer that is mapped to a standard web address; (b) a "response" handler that transfers control to another resource which completes the response, and (c) a tag library that helps developers create interactive form-based applications with server pages. However, the complexities associated with this framework hinders developers who may desire to have the flexibility of migrating to other frameworks.

The "SPRING" framework provided by SpringSource, Inc. is another well known framework. This framework can provide some solutions to technical challenges faced by Java developers and organizations wanting to create applications based on a Java platform and can be considered a collection of numerous smaller frameworks that are designed to work independently of each other so as to provide some improved functionalities when used together. However, the "SPRING" framework requires the interoperation of these numerous smaller frameworks in order to operate efficiently. This ultimately makes this framework solution very complex to implement.

As a result, there is still the need to develop a simple and robust solution for business application frameworks that are known to have highly coupled presentation and business layers. These solutions are desired in that current developers of presentation layer components invariably have to wait for the developers of the business layer components, and vice versa, in order to complete a project.

SUMMARY OF THE INVENTION

The instant disclosure describes a business application framework comprising a variety of components that operate on an event-driven basis. As used herein, an event comprises a well-defined function in the context of the overall business application. For example, in the case of an electronic commerce system, verification of a purchaser's identity, verification of a purchaser's credit or completion of a sales transaction would be viewed as separate events. As used herein, a component refers to a functional entity that is atomic (i.e., fundamental or elementary) in nature and caters to the fulfillment of a complete or sub-business process with specific predefined and context-independent inputs.

Thus, in an embodiment, a delegate component is provided that receives requests from one or more presentation layer components to process various events. For any given request, the delegate component instantiates a controller component to process the event. In turn, the controller instantiates (i.e., in object oriented programming, creates and initializes an object based on its class template) a routing logic component in order to determine a specific handler component for processing of the event by the underlying business layer. Once identified, the routing logic component instantiates the handler component that acts as a parent to one or more business layer components necessary to process the event. The handler component creates a response based on the processing performed by the business layer component(s) that is subsequently returned up the chain of the routing logic, controller and delegate components to the presentation layer component that initiated the request.

During the design phase of the business application, only a plurality of events relevant to the presentation layer need to be defined to allow completion of the presentation layer. Likewise, the various business layer components can be developed solely on the basis of what types of events will be processed, thereby eliminating the need for each layer to have intimate knowledge of the implementation of the other. In one embodiment, a parsable mapping in the form of an Extensible Markup Language (XML) file is provided between the particular events and the handlers developed to process each event, thereby making the business application framework highly configurable.

In this manner, the instant disclosure describes a straight-forward and robust technique that allows for the rapid development of business applications in comparison with prior art techniques.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

FIG. 8 is a sequence diagram illustrating processing of an event in accordance with the embodiment illustrated in FIG. 7.

DETAILED DESCRIPTION OF THE PRESENT EMBODIMENTS

Figure 1:
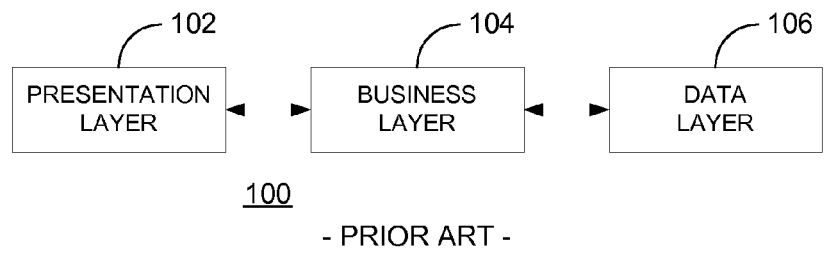
FIG. 1 is a block diagram illustrating abstraction layers typically found in a business application in accordance with prior art techniques.
Figure 2:
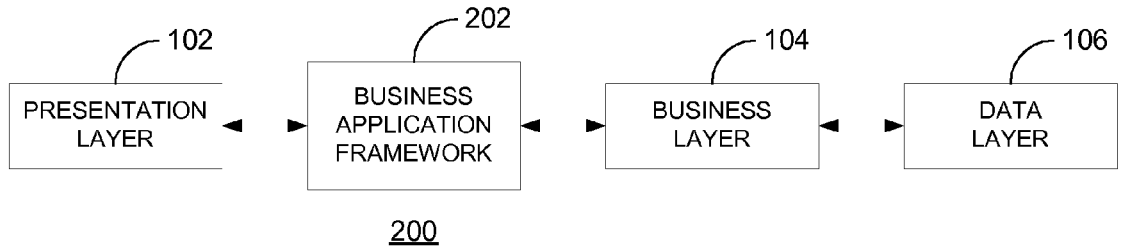
FIG. 2 is a block diagram illustrating abstraction layers of a business application incorporating a business application framework in accordance with the instant disclosure.

Referring now to FIG. 2, an abstraction of an application 200 in accordance with various embodiments described herein is illustrated. As shown, in addition to the presentation, business and data layers 102-106, a business application framework 202 is provided as an interface between the presentation layer 102 and the business layer 104. Such a configuration of the business application framework 202 provides a simple and robust framework that serves to decouple the presentation layer 102 from the business layer 104.

As used herein, the presentation layer refers to a layer of an application server model that is responsible for the delivering and formatting of information to an application layer (e.g., the user interface) for further processing or display and/or the receipt of information from a user of the application layer. The presentation layer may be developed with software programming tools such as java server pages (JSP), business server pages (BSP), or the like. The business layer refers to an environment that processes requests passed from other components implemented within the framework 202 and that dynamically generates the responses. The business layer can be developed within, for example, a J2EE (Java 2 Enterprise Edition) certified run-time environment. The business layer 104 can include logic that may be developed using Java that is based on the J2EE standard. Of course, other programming languages may be employed or, further still, functionally equivalent hardware or combined hardware/software implementations may be employed when developing either or both of the presentation and business layers 102, 104. For example, ABAP (Advanced Business Application Programming) programming language can be used, instead of J2EE, to access objects of applications running within the business application framework 202. In one embodiment, the business activation framework 202 is implemented using fundamental concepts of J2EE design patterns, thereby allowing components of the presentation layer 102 to reduce their dependency on components of the business layer 104.

In operation, the business activation framework 202 is configured to abstract business component implementations in order to make an application more robust in terms of scalability. That is, the business application framework 202 may be applied as an interface between the presentation and the business layers 102, 104 to create an interaction between the components of two layers while nevertheless operating independently of the components of the presentation layer 102 or the business layer 104. Rather, the business application framework 202 can meet its requirements simply by having knowledge of events/data that gets passed to and from it.

By employing designs using the business activation framework 202, development teams can independently develop presentation classes or objects (in terms of object oriented programming (OOP)), and then, tie or link such independently developed presentations classes or objects together at a later time. As such, future enhancements of any of the functionalities associated with the business activation framework 202 can be achieved with minimal impact on the presentation layer 102 or business layer 104, and vice versa. As one example, and as further described below, a developer working on a presentation layer 102 controller component or module may not need to wait for the business layer 104 component or module to delegate the associated call; the information relevant to the developer is the event(s) mapped to a handler component associated with the business activation framework 202. The developer can then implement his/her task by making provisions for such event(s) to be invoked when the business activation framework 202 becomes operational. The business activation framework 202 can then execute the remaining processes. It is noteworthy that in most J2EE applications, regardless of the efforts expended to reduce the dependency of one tier from another tier, some degree of coupling or dependency typically still exists that may adversely impact data or work flow. The business activation framework 150 is thus configured to help applications reduce such dependencies by its simple, efficient and effective implementation of event based business process delegation.

Figure 3:
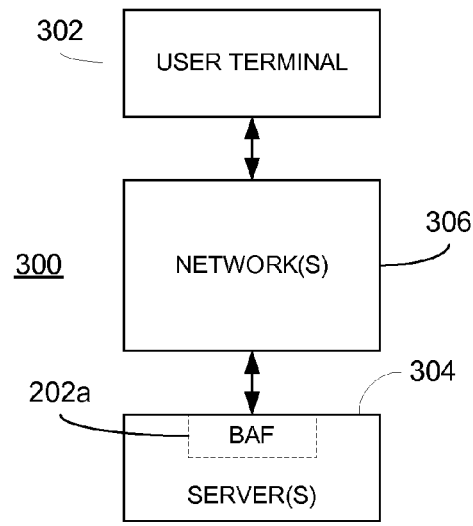
FIG. 3 is a block diagram of a system of the type in which the business application framework described herein may be beneficially incorporated.

FIG. 3 illustrates a system 300 in which the business application framework described herein may be beneficially deployed. In particular, the system 300 comprises one or more user terminals 302 in communication with one or more server computers 304 via one or more intervening networks 306. The system 300 implements those hardware and software components typically found in a web-based application. Thus, the user terminal 302 may comprise an appropriate processing device such as a laptop or desktop computer or similar device capable of accessing the network 306 using well known communication protocols, as well as rendering content (via, for example, a web browser) accessed via the network 306 on a suitable display. The server computer(s) 304, as known in the art, provide content and/or services in response to requests received from any of the user terminals 302, including implementation of web applications as described above. The network(s) 306 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and may comprise wireless network elements as known in the art.

The implementation of user terminals 302 in communication with servers 305 is commensurate with the well known client-server architecture often used to implement web-based applications or the like. As shown, the business application framework 202 is typically implemented on one or more the servers 304, although it may be possible to distribute the business application framework across both the server(s) 304 and the user terminals 302. As known in the art, implementation of the business application framework 202 substantially within the server(s) 304 incorporates the use of a so-called thin client at the user terminals 302, such results are provided to user terminals in a relatively simple way, e.g., as Java Server Pages.

Figure 4:
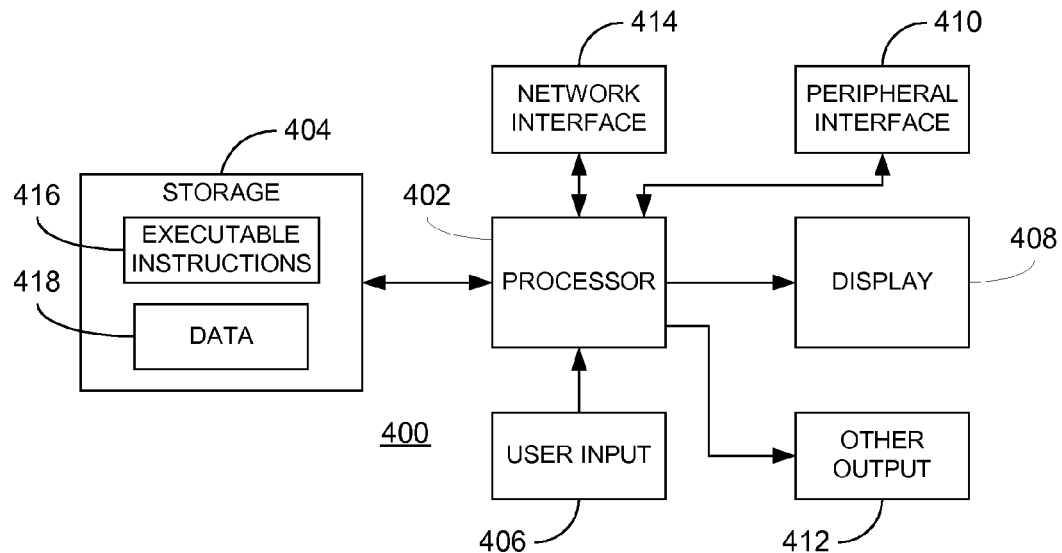
FIG. 4 is a block diagram of an exemplary processing device that may be used to implement the techniques described herein.

Referring now to FIG. 4, an exemplary device 400 that may be used to implement the present invention is further illustrated. With reference once again to FIG. 3, the device 400 or similar devices may be used to implement, for example, the one or more user terminals 302 or servers 304 that, in turn, may be used to implement the business application framework 202. Regardless, the device 400 comprises a processor 402 coupled to a storage component 404. The storage component 404, in turn, comprises stored executable instructions 416 and data 418. In a preferred embodiment, the processor 402 may comprise one or more processing devices such as a microprocessor, microcontroller, digital signal processor, or combinations thereof capable of executing the stored instructions 416 and operating upon the stored data 418. Likewise, the storage 404 may comprise one or more devices such as volatile or nonvolatile memory including but not limited to random access memory (RAM) or read only memory (ROM). Processor and storage arrangements of the types illustrated in FIG. 4 are well known to those having ordinary skill in the art. In a presently preferred embodiment, the processing techniques described herein are implemented as a combination of executable instructions and data within the storage component 404.

In a one embodiment, the device 400 may comprise one or more user input devices 406, a display 408, a peripheral interface 410, other output devices 412 and a network interface 414 all in communication with the processor 402. The user input device 406 may comprise any mechanism for providing user input to the processor 402. For example, the user input device 406 may comprise a keyboard, a mouse, a touch screen, microphone and suitable voice recognition application or any other means whereby a user of the device 400 may provide input data to the processor 402. The display 408, may comprise any conventional display mechanism such as a cathode ray tube (CRT), flat panel display, or any other display mechanism known to those having ordinary skill in the art. The peripheral interface 410 may include the necessary hardware, firmware and/or software necessary to communication with various peripheral devices, such as media drives (e.g., magnetic disk or optical disk drives) or any other source of input used in connection with the instant techniques. Likewise, the other output devices 412 may optionally comprise similar media drive mechanisms as well as other devices capable of providing information to a user of the device 400, such as speakers, LEDs, tactile outputs, etc. Finally, the network interface 414 may comprise hardware, firmware and/or software that allows the processor 402 to communicate with other devices via wired or wireless networks, as known in the art.

While the device 400 has been described as a preferred form for implementing the techniques described herein, those having ordinary skill in the art will appreciate that other, functionally equivalent techniques may be equally employed. For example, as known in the art, some or all of the executable instruction-implemented functionality may be implemented using firmware and/or hardware devices such as application specific integrated circuits (ASICs), programmable logic arrays, state machines, etc. Further still, other implementation of the device 400 may include a greater or lesser number of components than those illustrated. For example, when used to implement the servers 304, the device 400 may not include the display 408 or user inputs 406. Once again, those of ordinary skill in the art will appreciate the wide number of variations that may be used is this manner.

Figure 5:
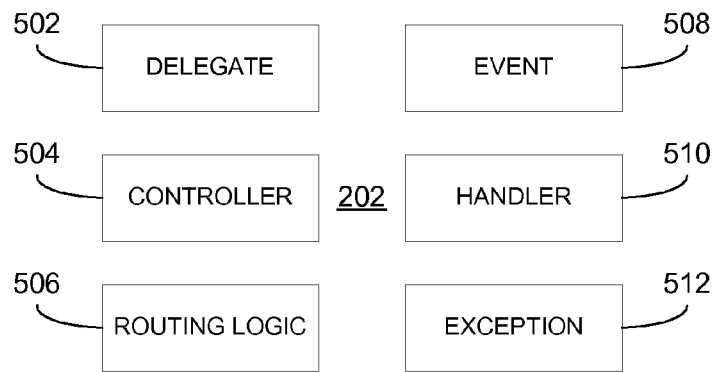
FIG. 5 is a block diagram illustrating a plurality of components that may be used to implement the business application framework described herein.

Referring now to FIG. 5, a schema for implementing a business application framework 150 in accordance with the instant disclosure is illustrated. In particular, the framework 202 comprises a plurality of components 502-512 that, in one embodiment, may each comprise a Java package of one or more related classes and/or interfaces, particular examples of which are described in greater detail below. More specifically, the various components may be implemented as so-called plain old java objects (POJO) that, as known in the art, comprise a very native implementation of Java code. Regardless, each of the components 502-512 perform functions in furtherance of processing events received from a presentation layer. Thus, the delegate component 502 is provided to receive requests from one or more presentation layer components to process events. In one embodiment, the delegate component includes a "handle business event" method that is called by the requesting presentation layer component, with an "event" as input and a "response" as output. A controller component 504 is provided and is, in practice, instantiated by the delegate component 502 in response to a received event processing request. The controller component 504 serves as a surrogate for business layer processing within the business application framework 202 that is called upon by the delegate component 502 to process the specific event. To this end, the controller component 504 is operative to instantiate a routing logic component 506 that operates to identify and subsequently instantiate a handler component 510 based on the event.

An event component 508 is provided to assist the routing logic component 506 in identifying which handler component 510 to employ when processing the event. The event component 508 encapsulates the details/data required by the routing logic and controller components 506, 504 to identify the handler which will process the appropriate data, and therefore implements methods for obtaining the event name and identifying the data to be processed by the underlying business component(s). The routing logic component 506 implements a "process business event" method that likewise uses the 'event" as input and the "response" as output, and that analyzes the event component 508 to obtain the event name and data to be used in identifying the appropriate handler. As described in greater detail below, a class within the handler component 510 is provided that assists the routing logic component 506 in identifying the necessary handler.

Regardless of the manner in which it is identified, the necessary handler within the handler component 510, once instantiated by the routing logic component 506, is configured to process the event based on whatever calls are necessary to one or more business layer components. In this sense, the handler component 510 serves as a "parent" to the "children" components in the business layer, calling them as needed to process the event. The business layer components, in turn, implement the necessary calls to data layer components needed to access the database underlying the entire business application. In this manner, the handler component 510 is an abstraction of the underlying business layer components from the point of view of any presentation layer components, thereby allowing the presentation layer components to be aware of only events (or event names).

Finally, an exception component 512 is provided to handle certain errors that may occur within the business application framework 202. For example, if a handler is not found to process a given event, an error needs to be returned to the presentation layer component that requested processing of the unsupported event. In a similar vein, if an undefined event is specified in a request or if an error occurs within a business layer component, an appropriate error will be returned by the exception component 512. Still other error conditions may be apparent to those of ordinary skill in the art, and the instant disclosure is not limited in this regard. In one embodiment, the exception component 512 may be fully configurable in order to meet the needs of any given business application. For example, a basic implementation may comprise empty placeholders provided within the exception component 512 (e.g., undefined methods) that are completed according to the needs of each particular application or that are otherwise extendable.

Figure 6:
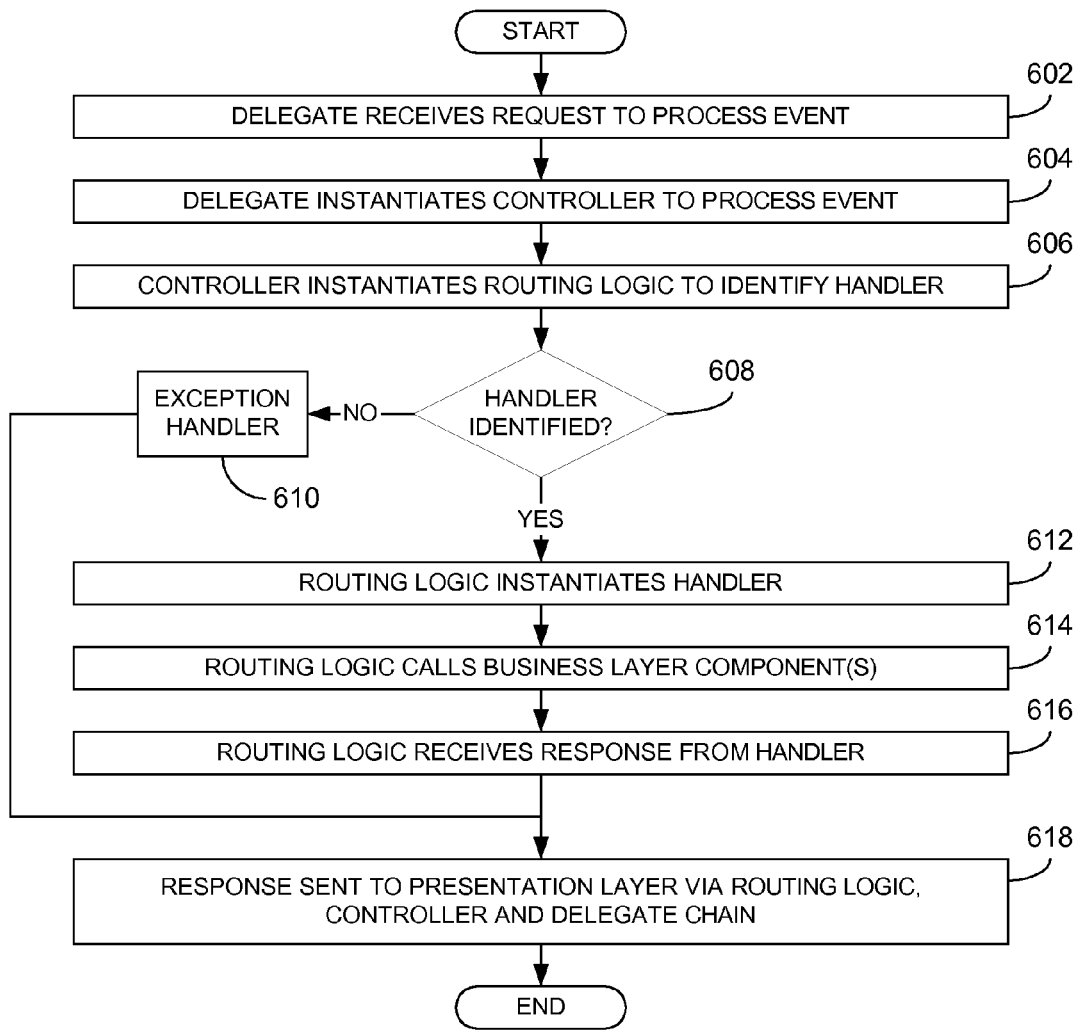
FIG. 6 is a flowchart illustrating operation of a framework as described herein when processing an event on behalf of a presentation layer component.

Referring now to FIG. 6, processing based on the framework 202 illustrated in FIG. 5 is further described. In one embodiment, the processing illustrated in FIG. 6 is preferably implemented using stored software instructions executed by one or more appropriate processors, although those of ordinary skill in the art will appreciate that other implementations are equally possible. Regardless, beginning at block 602, the delegate component 502 receives a request from a presentation layer component to process an event. In one embodiment, this is accomplished by the presentation layer component invoking a method exposed by the delegate component 502. In calling the delegate component 502, the presentation layer component specifies the event to be processed, i.e., includes an event name, and passes any data (or information about the data) to be processed by the relevant handler component.

Thereafter, at block 604, the delegate component, in response to the request, instantiates a controller component 504 to process the specific request. The controller component may be thought of as an invocation of the required business layer processing, only within the context of the business application framework 202. In order to cause the necessary processing to be performed, the controller component 504 instantiates a routing logic component 506, at block 606, in order to identify the necessary handler for actual processing of the event by the required business layer component(s). If the routing logic component fails to identify a handler for processing the event, as determined at block 608, processing continues at block 610 where the exception handler 512 provides an appropriate error response to the routing logic component that, at block 618, provides the error response to the requesting error layer component via the intervening controller and delegate components.

Assuming, however, that a suitable handler is identified at block 608, processing continues at block 612 where the routing logic instantiates the required handler via the handler component 510 and requests handling of the event. Additionally, the routing logic passes the data (or information about the data) to be processed to the required handler, which data is necessarily dependent on the nature of the event being handled. In turn, at block 614, the handler calls the business layer components used to process the event. The results of such processing are collected by the handler component 510 and, at block 616, returned to the routing logic component 506. The content of the response will necessarily depend on the nature of the event that was processed. Regardless, processing continues at block 618 where the response is passed by the routing logic component to the presentation layer component via the controller 504 and delegate components 502.

Figure 7:
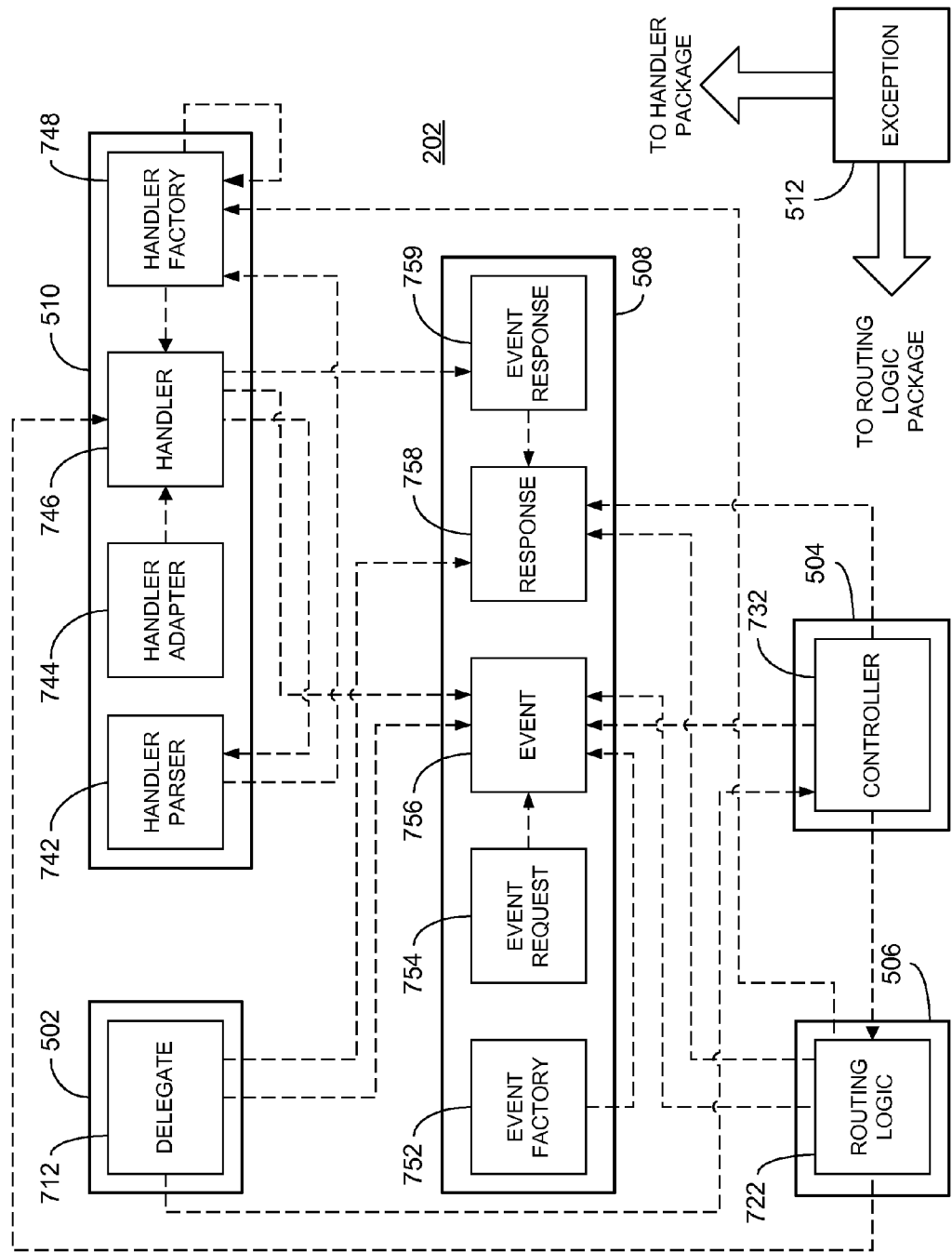
FIG. 7 is a block diagram illustrating in greater detail examples of classes and/or interfaces making up the plurality of components illustrated in FIG. 5.

FIG. 7, is a block diagram illustrating one embodiment of the business application framework 202 in greater detail. In particular, the framework illustrated in FIG. 7 illustrates the components 502-512 as Java packages each comprising one or more classes and/or interfaces, as those terms are used in OOP, for performing the various above-described functions. As known in the art, a Java package is a namespace used to organize a set of related classes and interfaces.

For example, the delegate component 502 can be operatively coupled to the controller component 504 and event component 508, wherein the delegation component 502 communicates with controller 504 components and event component 508 to delegate functions needed for processing a request associated with the framework. As such, the delegation component 502 includes a delegate class 712 that delegates specific events to other components each having respective classes that can perform the delegated event. As an example, a user can place an order via the World Wide Web in the course of conducting electronic shopping. After the user has made the selection via an interface connected to the Web, the delegation component 502 can delegate the event (e.g., buying) associated with the order to an appropriate handler component, as described above, so as to ensure the event is appropriately processed. To this end, the delegate class 712 instantiates a controller via a controller class 732 of the controller component 504 and interacts with the event component 508 via an event interface 756 (as input) and a response interface 758 (as output).

In a similar vein, the controller component 504 comprises a controller class 732 that communicates with the routing logic component 506 as well as the event component 508 via the event interface 756 and the response interface 758. In effect, instantiations of the controller class 732 serve as a façade for the underlying components used to process the event, i.e., the routing logic, handler and business layer components.

The routing logic component 506 comprises a single routing logic class 722 that invokes various classes and interfaces in the event component 508 and handler component 510 when determining handlers to handle various events; specifically, the event and response interfaces 756, 758, again as respective inputs and outputs, as well as a handler factory class 748 and a handler interface 746 as shown. A "process business event" method implemented by an instantiation of the routing logic class 722 analyzes the event object (via the event interface 756) to obtain the required event name and, further, to instantiate the handler factory class 748 to identify the appropriate handler for the event.

The event component 508 comprises the above-mentioned event interface 756 and response interface 758 in addition to an event factory class 752, event request class 754 and an event response class 759. As shown, both the event factory class 752 and the event request class use methods exposed by the event interface 756. Likewise, the event response class 759 uses one or more methods provided by the response interface 758. In interacting with the handler component 510, both the event interface 756 and the event response class expose methods used by the handler interface 746. In an embodiment, the event interface 756 comprises so-called accessors and mutators for respectively getting and setting values associated with the event (e.g., the event name and data to be processed as part of the event), whereas the response interface 758 comprises accessors for getting values associated with the result computed by the underlying business layer component(s). The event factory class 752 may be provided in those instances where an application comprises a large number of relatively complicated events. In this case, the event factory class 752 implements a so-called "factory pattern" (i.e., an interface for creating an object, but in which subclasses decide which class to instantiate, thereby letting the class defer instantiation to subclasses), the use of which permits the appropriate event to be identified. The event request class 754 is instantiated by a presentation layer component to set the appropriate data to be processed by business component layer components via the handler component 510, as described herein. In response, the handler component 510 returns the event response class 759 in order to pass the data, processed by the business layer components, back to the presentation layer component.

In operation, the handler component 510 can be customized to specific needs of projects or tasks so as to establish desired relationships between underlying business components that communicate with the business application framework 202. To this end, the handler component 510 comprises, in addition to the handler interface 746 and the handler factory 748, a handler parser class 742 and, optionally, a handler adapter class 744. As shown, the handler interface 746 invokes methods provided by the handler parser class 742 that, in turn, is capable of invoking the handler factory class 748. The handler factory class 748 uses methods provided by itself as well as the handler interface 746, whereas the handler adapter employs the handler interface 746. In one embodiment, a mapping in the form of an Extensible Markup Language (XML) descriptor file is provided between the particular events and the handlers developed to process each event. The handler parser class 742, when instantiated, parses the mapping based on the identified event (via the event interface 756) thereby determining which specific handler should be employed to process the event. In using an XML descriptor file, or any other format capable of being parsed, the business application framework 202 may be readily configured to accommodate any defined events. In turn, the handler factory 748, which implements "get business handler" method, uses java reflection to identify and instantiate the appropriate handler. Finally, the handler adapter class 744 comprises a so-called abstract class that may be extended as a functionally-equivalent option to implementing the handler interface 746.

The exception component 512 can include exceptions that are specific to the framework 202. It is noteworthy that the exception component 760 may be customized with specific features or specific requirements that relate to a given application's requirements implemented on the framework, i.e., it is freely configurable. For example, the exception component 512 can be configured or designed to handle contentions among routing calls associated with the framework 202.

Implemented in this fashion, the business activation framework 202 can provide improvement in performance factors as compared to prior art frameworks. As an example, the performance impact of implementing the business application framework 202 can be minimal in that it can be configured to operate without utilizing file I/O (i.e., reading and/or writing to files) or Java I/O transactions. This capability helps enhance performance in that network overhead is reduced.

An example of operation of the business application interface 202 illustrated in FIG. 7 is further shown in FIG. 8 in the form of a sequence diagram. In particular, FIG. 8 illustrates the manner in which the framework 202 processes an event request. Thus, the delegate 712, upon receiving a request from a presentation layer component, instantiates a controller 732 at step 802, which is subsequently confirmed at step 804. Thereafter, at step 806, the delegate 712 requests processing of the event by invoking a "process business event" method exposed by the controller 732. In turn, the controller 732 instantiates routing logic 722 at step 808 and likewise invokes a "process business event" method thereon to request processing of the event at step 810. At step 812, the routing logic 722 invokes "get event name" on the event interface 756 to obtain the event name required by the presentation layer. At step 814, the routing logic instantiates a handler via the handler factory class 748 and, at step 816, invokes methods provided by the handler factory class 748 (as described above) to determine specifically which handler to use for this event. With this knowledge in hand, the routing logic 722, at step 818, may request processing of the event by the previously-identified handler 746 that invokes the necessary business layer components to process the event. Although not shown in FIG. 8, the response provided by the handler 746 is passed back to the routing logic 722 and subsequently to the controller 732. The controller 732, in turn, provides the response to the delegate 712 that subsequently passes the response back to the requesting presentation layer component.

As described above, the instant disclosure describes a business application framework that may be employed to separate the operation and implementation of presentation and business layers in a business application. The framework includes a delegate component that, through invocation of controller and routing logic components, passes handling of the event to an appropriate handler component. The handler component has knowledge of those business layer components needed to process the event. In this manner, the business application framework described herein allows the development of the presentation and business layers to proceed independently. For at least these reasons, the above-described techniques represent an advancement over prior art teachings.

While particular preferred embodiments have been shown and described, those skilled in the art will appreciate that changes and modifications may be made without departing from the instant teachings. For example, although the example of electronic commerce applications has been used throughout, it is appreciated that the techniques described herein could be equally applied to other types of applications. It is therefore contemplated that any and all modifications, variations or equivalents of the above-described teachings fall within the scope of the basic underlying principles disclosed above and claimed herein.

What is claimed is:

1. An apparatus for processing data in an application comprising a presentation layer and a business layer, the apparatus comprising:

a business application framework in communication with and decoupling, but operating independently of, operation of the presentation layer and the business layer, the business application framework comprising:

a delegate component, implemented by a processing device including memory and a processor, that receives a request to process an event from a presentation layer component, the event requiring a response from at least one component in the business layer;

a controller component, implemented by the processing device and instantiated by and in communication with the delegate component, for processing the event;

a routing logic component, implemented by the processing device and instantiated by and in communication with the controller component, for instantiating at least one of a plurality of handler components to handle processing of the event by the business layer;

an event component, implemented by the processing device and in communication with the routing logic component, for:
determining, via an event factory class, which of the plurality of handler components should be instantiated to handle the event, and
setting, via an event request class instantiated by a component in the presentation layer, data to be processed by one or more components in the business layer; and
a handler component, implemented by the processing device, instantiated by and in communication with the routing logic component and implementing the at least one of the plurality of handler components, that invokes the one or more components in the business layer in order to generate the response to the event.

2. The apparatus of claim 1, wherein the handler component provides a response to the routing logic component that, in turn, provides the response to the presentation layer component via the controller component and the delegate component.

3. A non-transitory computer-readable medium storing instructions, the instructions comprising:
one or more instructions which, when executed by a processor, cause the processor to:
implement a business application framework in communication with and decoupling, but operating independently of, operation of the presentation layer and the business layer;
receive a request to process an event, the event requiring a response from at least one component in the business layer;
instantiate a controller component for processing the event;
instantiate a routing logic component that instantiates at least one a plurality of handler components to handle processing of the event by the business layer;
instantiate an event component for determining, via an event factory class, which of the plurality of handler components should be instantiated to handle the event, and for setting, via a request class instantiated by a component in the presentation layer, data to be processed by one or more components in the business layer; and
instantiate the at least one of the plurality of handler components to process the event, by invoking the one or more components in the business layer in order to generate the response to the event.

4. The non-transitory computer-readable medium of claim 3, where the instructions further comprise:
one or more instructions to receive a response from at least one of the plurality of components; and
one or more instructions to provide the response to the presentation layer via the controller component and the delegate component.

5. A system comprising:
one or more devices operating in a business application framework, in communication with and decoupling, but operating independently of, a business layer and a presentation layer, the one or more devices being to:
receive requests from at least one presentation layer component, the at least one presentation layer component being:
included in the presentation layer, and
adapted to be responsive to an event;

process the event via a delegate component that instantiates a controller component;
use the controller component to instantiate a routing logic component that instantiates at least one of a plurality of handler components to handle processing of the event by the business layer,
the business layer comprising at least one business layer component for generating a response to the event,
the at least one of the plurality of handler components being determined by an event component via an event factory class, and
data to be processed by one or more components in the business layer being set by the event component via an event request class; and
use a handler component to implement the at least one of the plurality of handler components that invoke the one or more components in the business layer component to process the event.

6. A method for processing data in an application comprising a presentation layer and a business layer, the method comprising:
receiving, by a delegate component of a processing device including a processor and memory and from a presentation layer component, a request to process an event, the event requiring a response from at least one component in the business layer, wherein the delegate component is implemented by a business application framework in communication with and decoupling, but operating independently of, operation of the presentation layer and the business layer;
instantiating, by the delegate component, a controller component implemented by the business application framework for processing the event;
instantiating, by the controller component of the processing device, a routing logic component implemented by the business application framework that instantiates at least one of a plurality of handler components to handle processing of the event by the business layer;
instantiating, by the routing logic component of the processing device, an event component implemented by the business application framework for determining, via an event factory class, which of the plurality of handler components should be instantiated to handle the event, and for setting, via a request class instantiated by a component in the presentation layer, data to be processed by one or more components in the business layer; and
instantiating, by the routing logic component, the at least one of the plurality of handler components to process the event by invoking the one or more components in the business layer in order to generate the response to the event.

7. The method of claim 6, further comprising:
receiving, by the routing logic component, a response from the handler component; and
providing, by the routing logic component, the response to the presentation layer via the controller component and the delegate component.

* * * * *